United States Patent
LaMontagne et al.

(10) Patent No.: US 12,538,989 B2
(45) Date of Patent: Feb. 3, 2026

(54) TRANSPARENT DOOR

(71) Applicant: Hussmann Corporation, Bridgeton, MO (US)

(72) Inventors: Rick M. LaMontagne, Warrenton, MO (US); Michael S. Estes, Bradenton, FL (US); Stephen Pew, Clarksville, TN (US); Saicharan Sunkara, Sarasota, FL (US)

(73) Assignee: HUSSMANN CORPORATION, Bridgeton, MO (US)

( * ) Notice: Subject to any disclaimer, the term of this patent is extended or adjusted under 35 U.S.C. 154(b) by 829 days.

(21) Appl. No.: 17/524,243

(22) Filed: Nov. 11, 2021

(65) Prior Publication Data
US 2022/0142379 A1 May 12, 2022

Related U.S. Application Data

(60) Provisional application No. 63/112,985, filed on Nov. 12, 2020.

(51) Int. Cl.
 *A47F 3/12* (2006.01)
 *A47F 3/04* (2006.01)
 (Continued)

(52) U.S. Cl.
 CPC .............. *A47F 3/125* (2013.01); *A47F 3/043* (2013.01); *A47F 3/0434* (2013.01);
 (Continued)

(58) Field of Classification Search
 CPC ........ A47F 3/043; A47F 3/0434; A47F 3/125; E06B 3/66333; E06B 3/66366; E06B 2003/66338; F25D 23/028
 (Continued)

(56) References Cited

U.S. PATENT DOCUMENTS 2,011,557 A * 8/1935 Anderegg ........... E06B 3/66333
 52/309.3
2,094,381 A * 9/1937 Games ................ E06B 3/66328
 52/786.13
(Continued)

FOREIGN PATENT DOCUMENTS

DE 102008010586 A1 8/2009
DE 112014002800 T5 3/2016
(Continued)

OTHER PUBLICATIONS

Australian Patent Office Examination Report No. 1 for application 2021266331, dated Mar. 26, 2023, 8 pages.
(Continued)

*Primary Examiner* — James M Ference
(74) *Attorney, Agent, or Firm* — Michael Best & Friedrich LLP

(57) ABSTRACT

A door assembly including a first glass pane, a second glass pane, and a spacer positioned between the first glass pane and the second glass pane such that the first pane and the second pane are separated by the spacer. The door assembly also includes an element that is coupled to the first glass pane and the second glass pane and positioned exterior of the spacer. The spacer and the element cooperate to at least partially define a seal passage, and a clear material is disposed in the seal passage to seal the space, the clear material configured to provide structural support to the assembly.

20 Claims, 13 Drawing Sheets

(51) Int. Cl.
*E06B 3/663* (2006.01)
*F25D 23/02* (2006.01)
(52) U.S. Cl.
CPC ...... *E06B 3/66333* (2013.01); *E06B 3/66366* (2013.01); *E06B 2003/66338* (2013.01); *F25D 23/028* (2013.01)
(58) Field of Classification Search
USPC ...................................................... 52/800.11
See application file for complete search history.

(56) References Cited

U.S. PATENT DOCUMENTS

| | | | | |
|---|---|---|---|---|
| 3,441,924 A * | 4/1969 | Peek | G08B 13/20 | 52/786.13 |
| 3,631,630 A * | 1/1972 | Buffington | F25D 23/02 | 49/501 |
| 3,703,425 A * | 11/1972 | Delmonte et al. | B32B 17/10917 | 156/286 |
| 3,868,805 A * | 3/1975 | Battersby | E06B 3/66342 | 52/402 |
| 3,940,898 A * | 3/1976 | Kaufman | E06B 3/66328 | 52/786.13 |
| 3,971,178 A * | 7/1976 | Mazzoni | E06B 3/5418 | 52/786.13 |
| 4,226,063 A * | 10/1980 | Chenel | E06B 3/677 | 52/786.1 |
| 4,551,364 A * | 11/1985 | Davies | B29C 70/085 | 428/33 |
| 4,637,167 A * | 1/1987 | Svensson | F25D 23/028 | 49/501 |
| 4,831,799 A * | 5/1989 | Glover | E06B 3/66328 | 52/786.13 |
| 4,891,912 A * | 1/1990 | Bockwinkel | F25D 23/082 | 49/478.1 |
| 4,962,076 A * | 10/1990 | Chu | C08K 5/37 | 502/158 |
| 4,967,519 A * | 11/1990 | Sieber | E06B 1/64 | 52/60 |
| 4,994,309 A * | 2/1991 | Reichert | E06B 3/66357 | 52/204.593 |
| 4,998,382 A * | 3/1991 | Kostos | E06B 3/6617 | 49/504 |
| 5,007,217 A * | 4/1991 | Glover | E06B 3/6715 | 52/204.593 |
| 5,024,023 A * | 6/1991 | Kostos | E06B 3/5427 | 52/786.13 |
| 5,035,085 A * | 7/1991 | Mamelson | A47F 3/043 | 49/478.1 |
| 5,051,455 A * | 9/1991 | Chu | C09K 3/1018 | 524/425 |
| 5,053,442 A * | 10/1991 | Chu | C08K 9/04 | 524/425 |
| 5,087,489 A * | 2/1992 | Lingemann | E06B 3/66323 | 52/786.13 |
| 5,097,642 A * | 3/1992 | Richardson | F25D 23/028 | 52/207 |
| 5,107,655 A * | 4/1992 | Lindgren | E06B 3/6621 | 52/786.13 |
| 5,111,618 A * | 5/1992 | Kaspar | E06B 3/5427 | 49/504 |
| 5,113,628 A * | 5/1992 | Richardson | E06B 3/66366 | 52/786.13 |
| 5,119,605 A * | 6/1992 | Sieber | E06B 1/64 | 52/60 |
| 5,177,916 A * | 1/1993 | Misera | E06B 3/66309 | 156/107 |
| 5,255,473 A * | 10/1993 | Kaspar | A47F 3/043 | 49/504 |
| 5,313,761 A * | 5/1994 | Leopold | E06B 3/667 | 52/656.1 |
| 5,531,047 A * | 7/1996 | Leopold | E06B 3/6775 | 52/204.591 |
| 5,553,440 A * | 9/1996 | Bulger | E06B 3/66309 | 52/786.13 |
| 5,813,191 A * | 9/1998 | Gallagher | E06B 3/66309 | 52/204.5 |
| 6,115,989 A * | 9/2000 | Boone | E06B 3/66366 | 52/786.13 |
| 7,976,916 B2 * | 7/2011 | Riblier | A47F 3/0434 | 428/34.7 |
| 8,011,137 B2 * | 9/2011 | Durfield | F16J 15/027 | 49/501 |
| 8,162,414 B2 * | 4/2012 | Weiss | A47F 3/0434 | 312/138.1 |
| 8,756,879 B2 * | 6/2014 | Cempulik | E04C 1/42 | 52/204.595 |
| 9,532,660 B2 * | 1/2017 | Jafa | A47F 3/0404 | |
| 9,661,940 B2 * | 5/2017 | Schneider | E06B 7/16 | |
| 9,756,965 B2 * | 9/2017 | Isfort | E06B 3/66333 | |
| 9,782,952 B2 | 10/2017 | Weiss | | |
| 9,810,016 B2 * | 11/2017 | Pellini | E06B 9/264 | |
| 10,060,181 B1 * | 8/2018 | Jones, Jr. | E06B 7/28 | |
| 10,111,538 B2 * | 10/2018 | Weiss | E05F 17/004 | |
| 10,165,870 B2 * | 1/2019 | Artwohl | E04B 1/803 | |
| 10,526,836 B2 * | 1/2020 | Isaacs | E06B 3/56 | |
| 10,704,318 B2 | 7/2020 | Baquet et al. | | |
| 2001/0015037 A1 * | 8/2001 | Thompson, Jr. | E06B 3/66366 | 52/786.13 |
| 2002/0032994 A1 * | 3/2002 | Boone | E06B 3/66366 | 52/204.5 |
| 2003/0064176 A1 * | 4/2003 | Johnson | F28D 20/02 | 428/34 |
| 2006/0006612 A1 * | 1/2006 | Durfield | F16J 15/027 | 277/644 |
| 2007/0160781 A1 * | 7/2007 | Landon | B82Y 30/00 | 428/34 |
| 2009/0021130 A1 * | 1/2009 | Weiss | A47F 3/0434 | 312/405 |
| 2010/0031580 A1 * | 2/2010 | Lee | B29C 65/7811 | 49/504 |
| 2011/0072961 A1 * | 3/2011 | Jungkuist | F41H 5/0407 | 89/905 |
| 2012/0090253 A1 * | 4/2012 | Beresford | E06B 3/66333 | 52/204.593 |
| 2013/0019616 A1 * | 1/2013 | Reichert | A47F 3/001 | 49/70 |
| 2013/0285517 A1 * | 10/2013 | Wach | A47F 3/043 | 49/504 |
| 2015/0151511 A1 * | 6/2015 | Weiss | E06B 3/66333 | 428/192 |
| 2015/0223619 A1 * | 8/2015 | Artwohl | A47F 3/002 | 428/69 |
| 2015/0245720 A1 * | 9/2015 | Isfort | A47F 3/0434 | 312/116 |
| 2016/0073792 A1 * | 3/2016 | Bouwman | A47F 3/0434 | 49/502 |
| 2016/0120336 A1 * | 5/2016 | Schneider | E06B 3/025 | 312/138.1 |
| 2016/0166085 A1 * | 6/2016 | Twohy | A47F 3/0434 | 62/248 |
| 2016/0174734 A1 * | 6/2016 | Artwohl | E06B 3/6612 | 428/34 |
| 2017/0298680 A1 * | 10/2017 | Schreiber | E06B 3/66333 | |
| 2017/0360221 A1 * | 12/2017 | Artwohl | A47F 3/0434 | |
| 2017/0362882 A1 * | 12/2017 | Boucher | E06B 3/66352 | |
| 2018/0216396 A1 * | 8/2018 | Isaacs | E06B 3/663 | |
| 2018/0252022 A1 * | 9/2018 | Boucher | E06B 3/66352 | |
| 2018/0307111 A1 * | 10/2018 | Le Houx | B32B 17/10467 | |
| 2018/0340365 A1 * | 11/2018 | Kuster | E06B 3/66319 | |
| 2018/0344053 A1 * | 12/2018 | Schreiber | A47F 3/0434 | |
| 2019/0018277 A1 * | 1/2019 | Berner | B32B 17/10532 | |
| 2019/0059613 A1 * | 2/2019 | Artwohl | E05D 5/065 | |
| 2019/0112866 A1 * | 4/2019 | Baquet | E06B 3/66342 | |
| 2019/0137797 A1 * | 5/2019 | Bjergaard | G02F 1/163 | |
| 2019/0211613 A1 * | 7/2019 | Culot | E06B 3/6775 | |
| 2020/0056423 A1 * | 2/2020 | Bjergaard | G02F 1/153 | |
| 2020/0071988 A1 * | 3/2020 | Gubbels | C09J 183/06 | |

(56) References Cited

U.S. PATENT DOCUMENTS

| | | | |
|---|---|---|---|
| 2020/0141180 A1* | 5/2020 | Isaacs | E06B 3/5418 |
| 2022/0090846 A1* | 3/2022 | Smajser | E06B 3/66333 |
| 2022/0142379 A1* | 5/2022 | LaMontagne | E06B 3/66328 |
| 2022/0160146 A1* | 5/2022 | LaMontagne | A47F 3/043 |

FOREIGN PATENT DOCUMENTS

| | | |
|---|---|---|
| EP | 2194222 A2 | 6/2010 |
| EP | 3023035 A1 | 5/2016 |
| EP | 3230547 B1 | 6/2019 |
| EP | 3730731 A1 | 10/2020 |
| WO | 2006025953 A1 | 3/2006 |
| WO | 2019053547 A1 | 3/2019 |

OTHER PUBLICATIONS

New Zealand Patent Office First Examination report for the Application No. 782279 dated Jul. 20, 2023 (7 pages).

\* cited by examiner

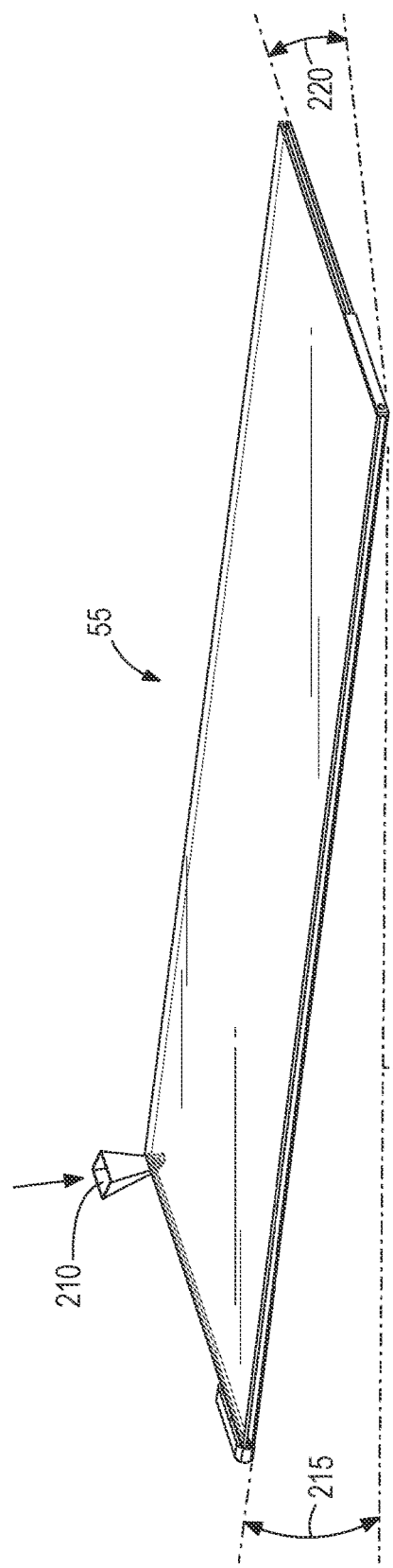
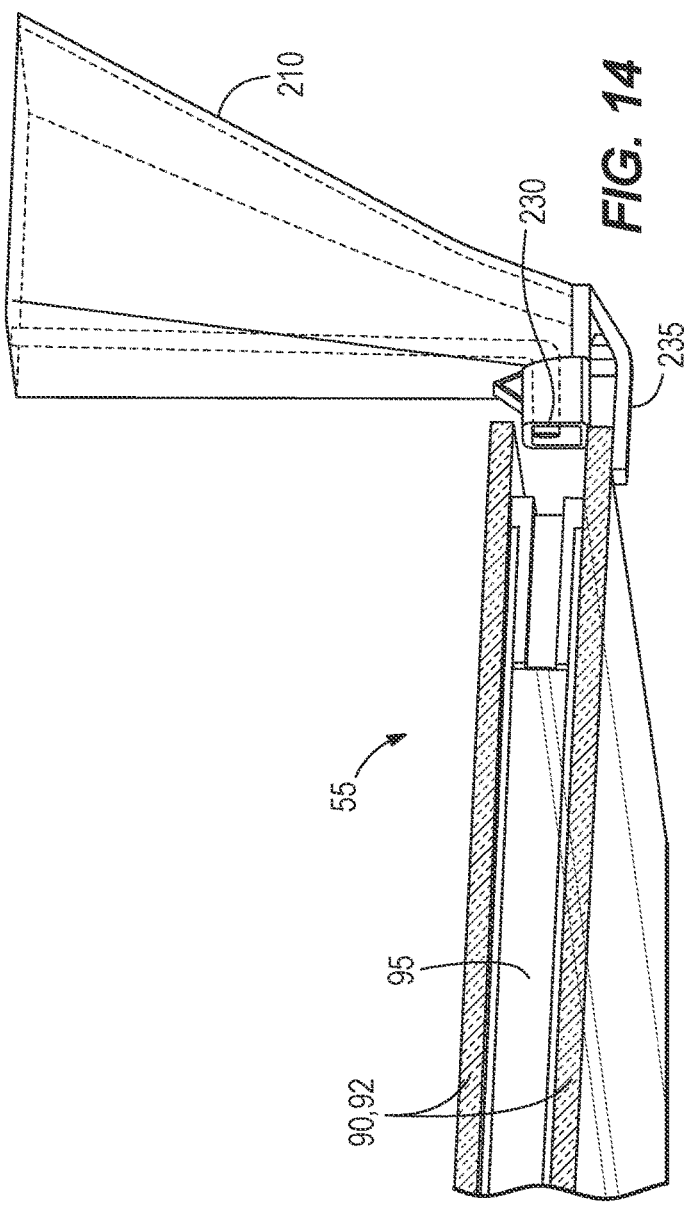

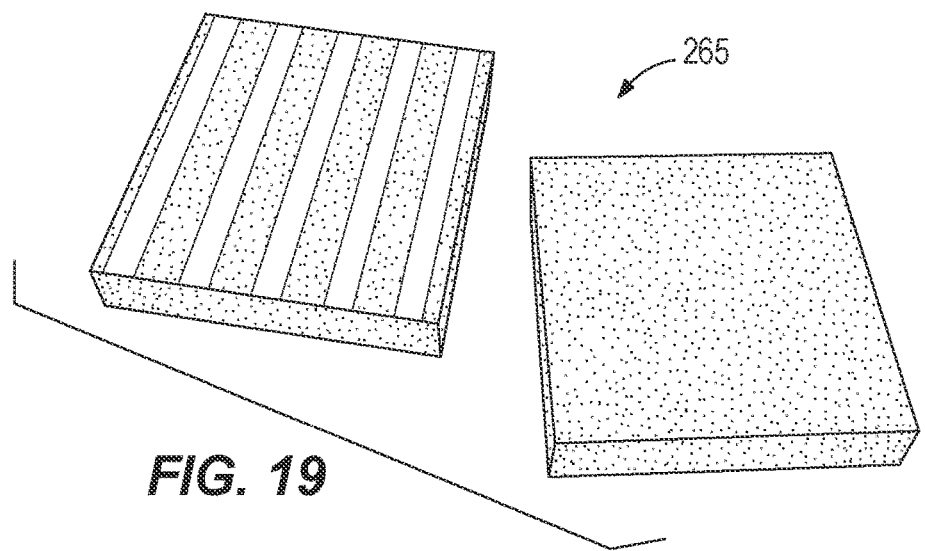
FIG. 19
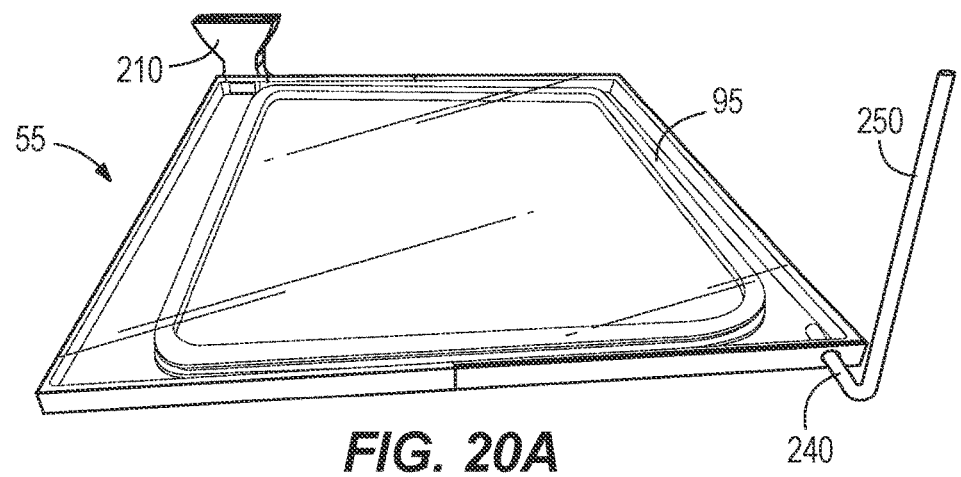
FIG. 20A
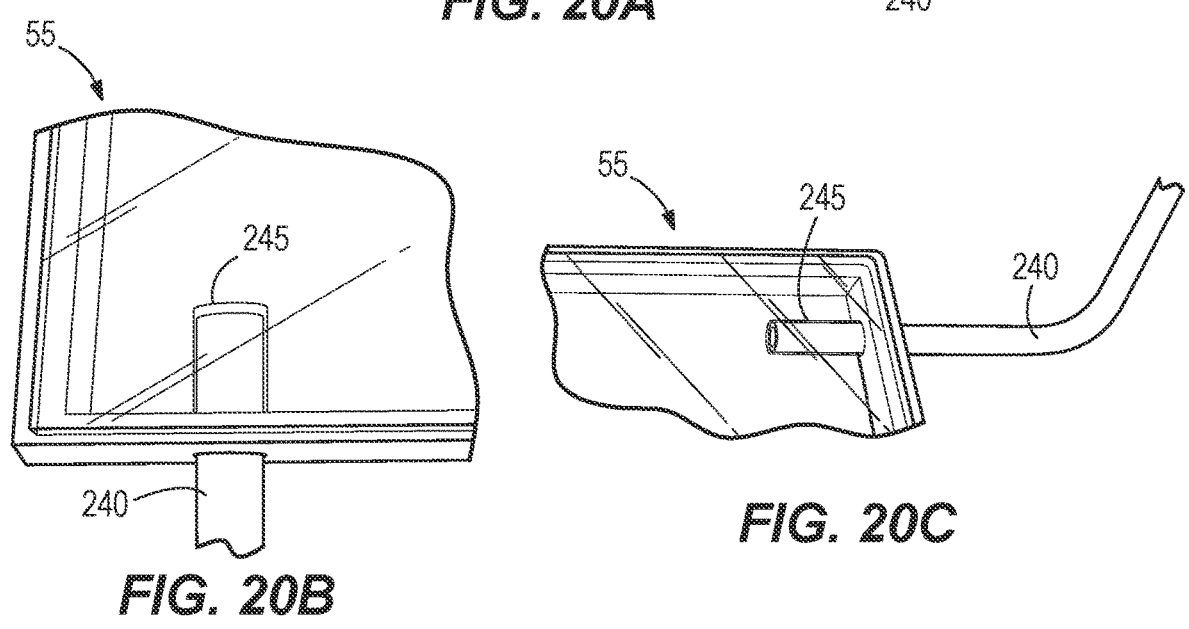
FIG. 20B
FIG. 20C

TRANSPARENT DOOR

CROSS-REFERENCE TO RELATED APPLICATIONS

The present invention claims priority to U.S. Provisional Patent Application No. 63/112,985, filed on Nov. 12, 2020, and entitled "Transparent Door," the contents of which is hereby incorporated by reference in its entirety.

BACKGROUND

The present invention relates to a transparent door and, more particularly, to a transparent door for merchandisers.

Existing merchandisers (collectively referred to as 'merchandisers') generally include structure that defines a product support or display area for supporting and displaying products (e.g., for stocking or selection of products, or to be visible and accessible through an opening in the front of the merchandiser). Merchandisers are generally used in retail food store applications such as grocery or convenience stores or other locations where food product is displayed in a refrigerated condition.

Some merchandisers include doors to enclose the product display area of the case and reduce the amount of cold air released into the surrounding environment. The doors typically include one or more glass panels that allow a consumer to view the food products stored inside the case. These doors include a door frame and other components that are opaque or only marginally translucent, which reduces the viewable window for product in the merchandiser.

SUMMARY

In one aspect, the present invention provides an assembly including a first glass pane, a second glass pane, a spacer positioned between the first glass pane and the second glass pane such that the first pane and the second pane are separated by a space, and an element that is coupled to the first glass pane and the second glass pane and positioned exterior of the spacer. The spacer and the element at least partially define a seal passage, and a clear material is disposed in the seal passage to seal the space and to provide structural support to the assembly.

In another aspect, the invention provides an assembly including a first glass pane, a second glass pane, and a spacer that is positioned between the first glass pane and the second glass pane. The spacer is formed of a transparent material and is defined by a monolithic structure extending continuously around at least three sides of the glass assembly adjacent a perimeter of the first glass pane and the second glass pane.

Other aspects of the invention will become apparent by consideration of the detailed description and accompanying drawings.

BRIEF DESCRIPTION OF THE DRAWINGS

FIG. 13 is a perspective view illustrating placement of the door during assembly and including a funnel coupled to the door.

FIG. 14 is a perspective view of the funnel of FIG. 13, illustrating how the funnel is attached to the door.

FIG. 19 is a perspective view of vent material to vent the spacer cavity during fill.

FIG. 20A is perspective view of placement of the door during assembly, with the funnel and a vent tube attached to the door.

FIG. 20B is an enlarged view of the vent tube of FIG. 20A attached to the door.

FIG. 20C is a perspective view of the vent tube of FIG. 20A attached to the door.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

For ease of discussion and understanding, the following detailed description illustrates a transparent assembly for use with a merchandiser 10 to enable viewing of items behind the transparent assembly. It should be appreciated that the merchandiser 10 is provided for purposes of illustration, and that the transparent assembly can be used with any structure through which viewing is desired. Examples of such structure includes, but are not limited to, a walk-in cooler, a walk-in freezer, a low temperature merchandiser (e.g., operating at a temperature below 32° Fahrenheit), a medium temperature merchandiser (e.g., operating at a temperature range of 34° to 41° Fahrenheit), a window, or any other structure through which it is desired to view one or more items. The term 'door assembly' or 'door assemblies' in the description is only one example of the transparent assembly and not intended to be limiting. Furthermore, the transparent assembly may or may not include elements that are not transparent.

Figure 1:
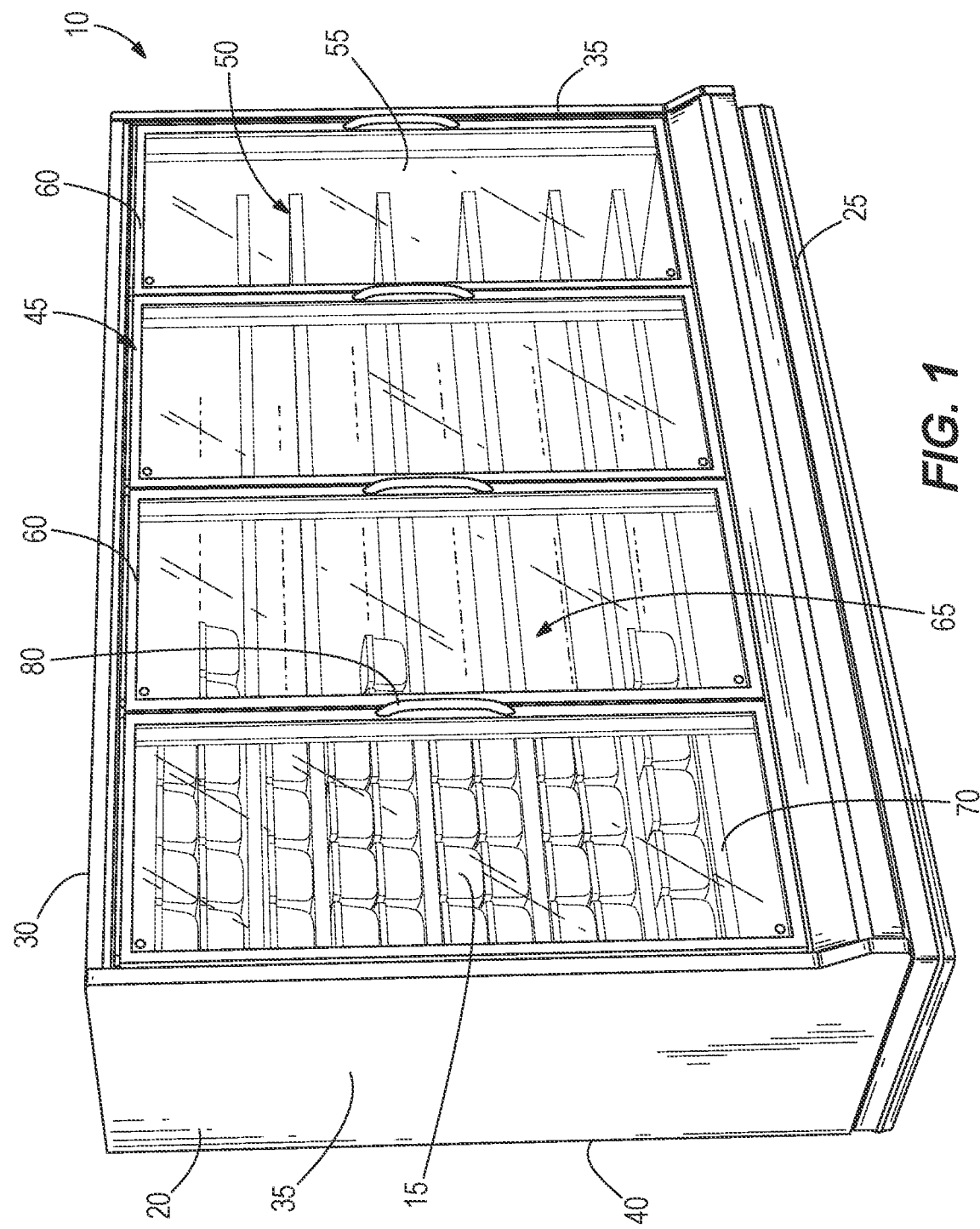
FIG. 1 is a perspective view of an exemplary merchandiser including a case frame and door assemblies embodying the invention.

FIG. 1 illustrates the merchandiser 10, which may be located in a supermarket, a convenience store, or other retail location (not shown) for presenting fresh food, frozen food, beverages, or other product 15 to consumers. The merchandiser 10 includes a case 20 that is defined by a base 25, a canopy 30, opposite side walls 35, and a rear wall 40. The case 20 also includes a case frame 45 that defines an access opening 50 adjacent a front of the merchandiser 10, and doors 55 that are coupled to the case frame 45 to provide access to product 15 through the access opening 50. The area partially enclosed by the base 25, the canopy 30, and the rear wall 40 defines a product 15 support area 65 that supports and/or displays the product 15 in the case 20. For example, the product 15 can be displayed on racks or shelves 70 extending from the rear wall 40 toward the case frame 45, and the product 15 is accessible by consumers through the doors 55 adjacent a front of the case 20. As shown in FIG. 1, the product 15 and the shelves are visible behind the doors 55.

Figure 2:
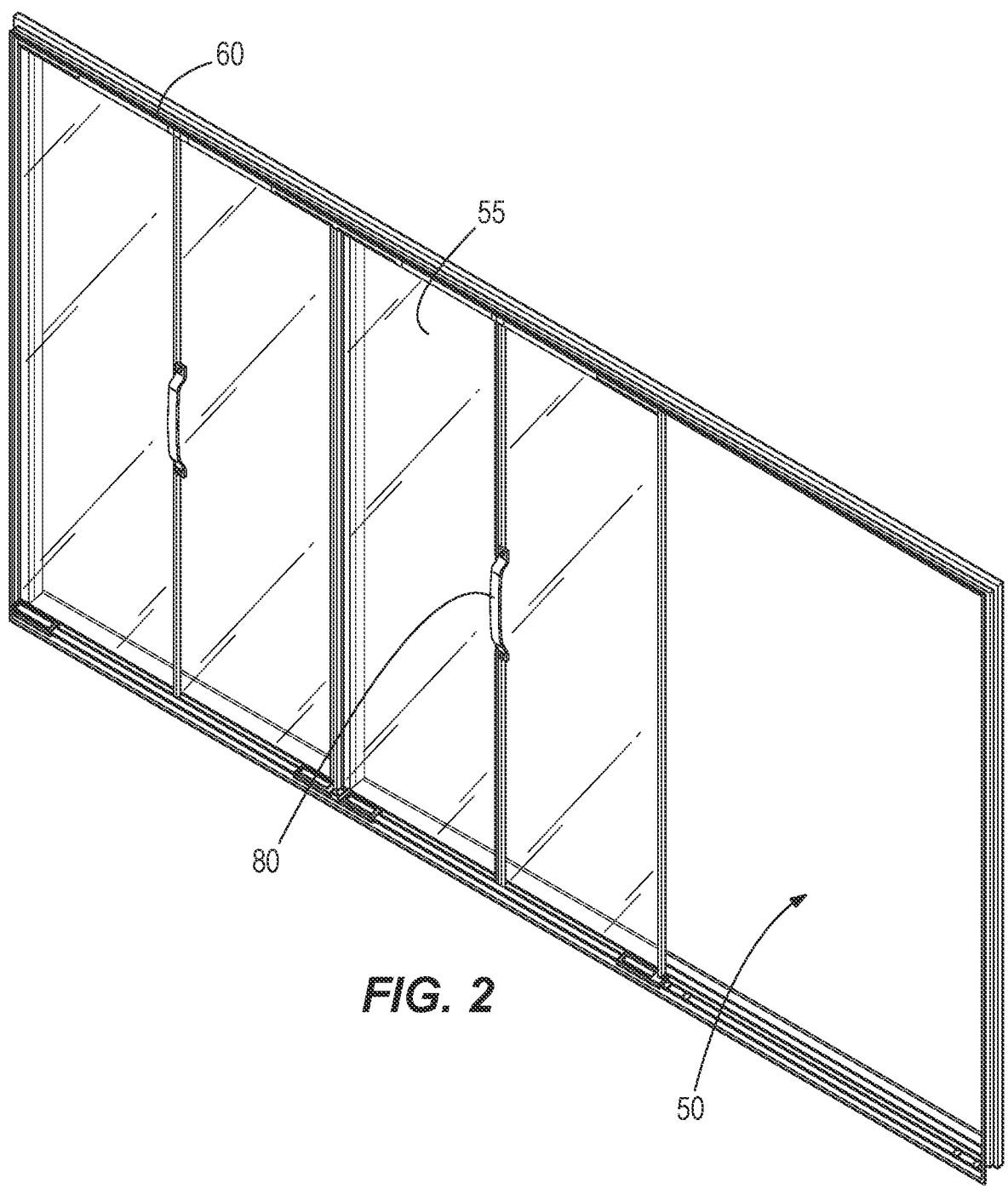
FIG. 2 is a perspective view of a portion of the case frame and the door assemblies attached to the case frame.

Referring to FIGS. 1 and 2, the doors 55 attach to the case frame 60. The doors 55 are configured to be oriented (or reoriented) in either a left-hand open configuration or a right-hand open configuration. The doors 55 do not need to have the same configuration (e.g., the merchandiser 10 can include a combination of left-hand and right-hand open configuration). For example, FIG. 2 illustrates an embodiment of the merchandiser 10 showing the doors 55 in a configuration with the doors 55 are separated into two sets of double doors 55 with a set of double doors 55 positioned in each frame section. Each set of double doors 55 includes a left-hand opening door 55 and a right-hand opening door 55. A handle 80 (shown in FIGS. 1-2) can be installed on each door 55 to facilitate opening and closing the door 55.

Figure 3:
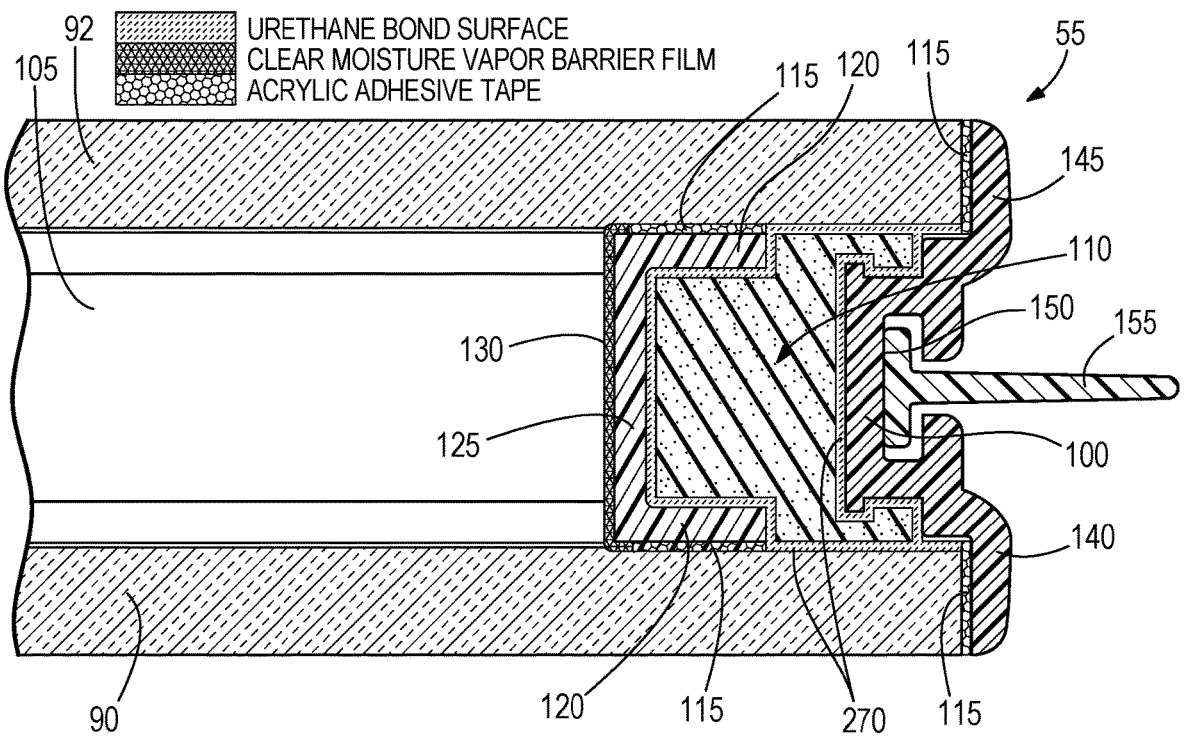
FIG. 3 is a section view of a portion of one door assembly illustrating glass panes that are separated by a spacer, and an edge seal that cooperates with the spacer to define a seal passage between the glass panes.
Figure 8:
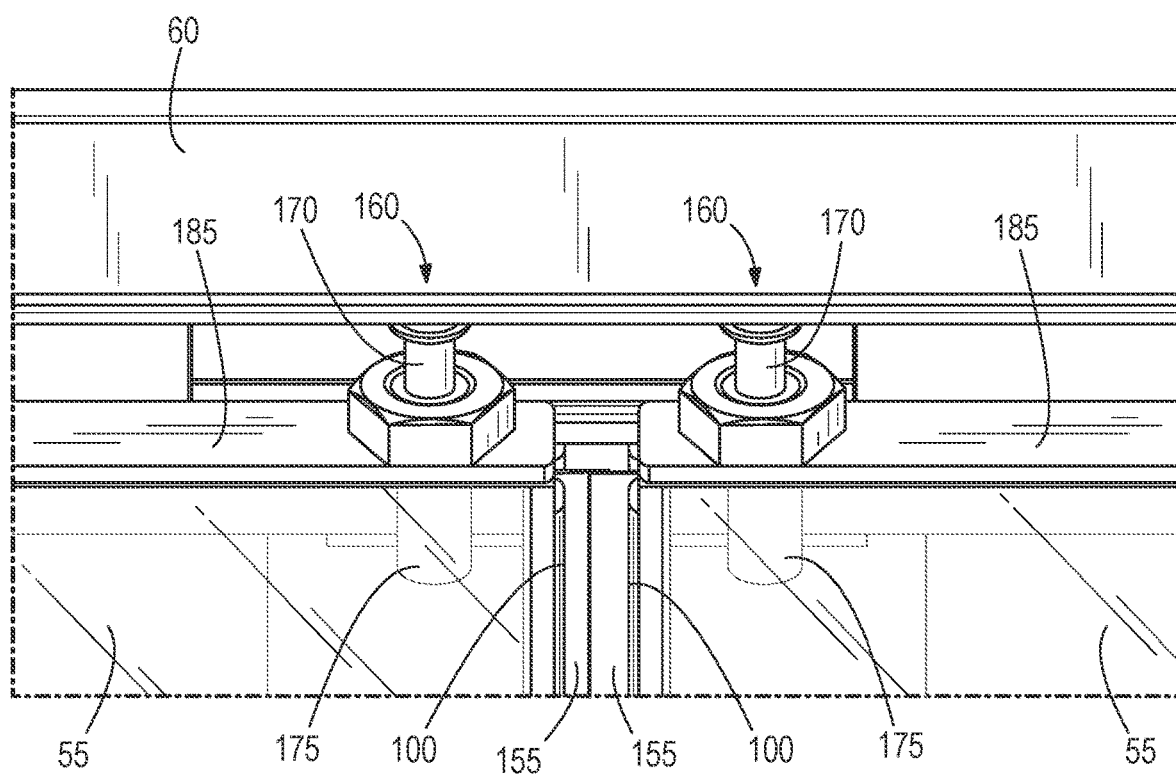
FIG. 8 is a perspective view of an upper portion of two adjacent door assemblies attached to the case frame and including hinge pins, hinge pivot bushings, and overlapping wiper gaskets.
Figure 9:
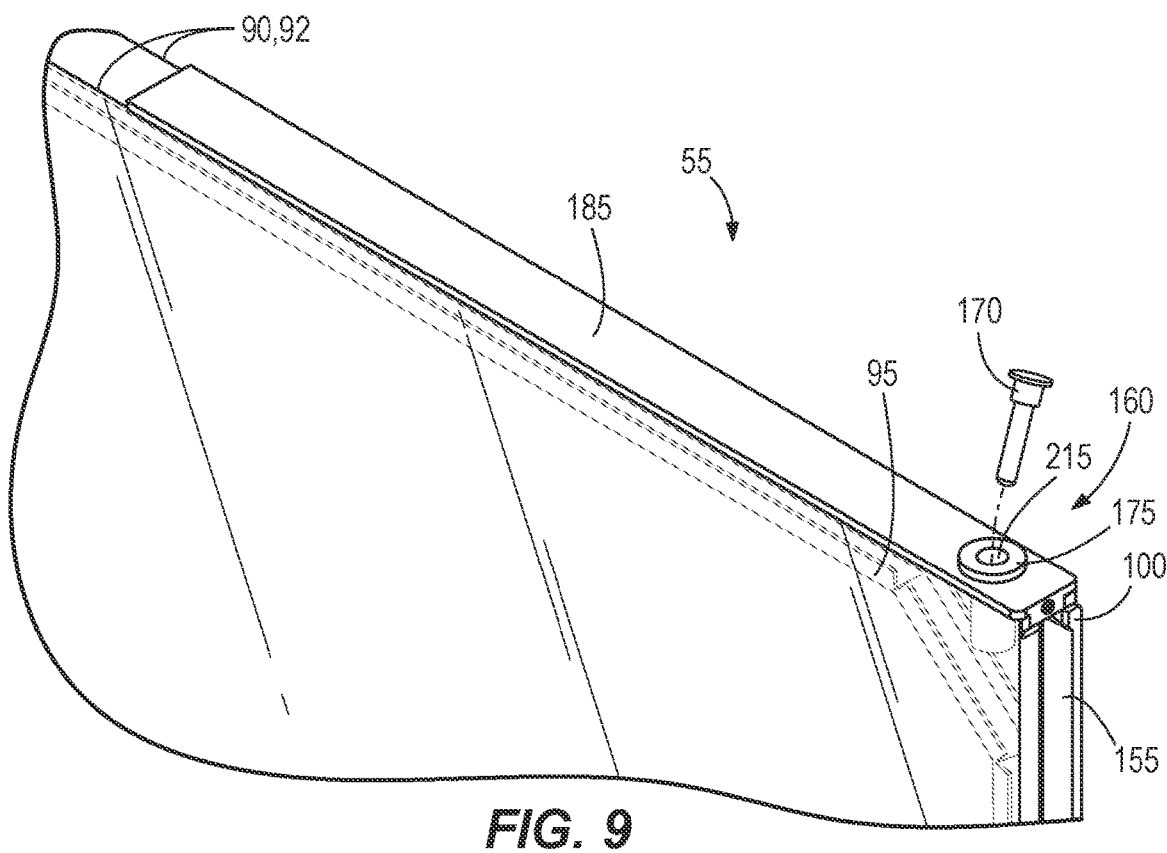
FIG. 9 is a perspective view of one door assembly illustrating the hinge pin, the hinge pivot bushing, and a hinge plate.
Figure 21:
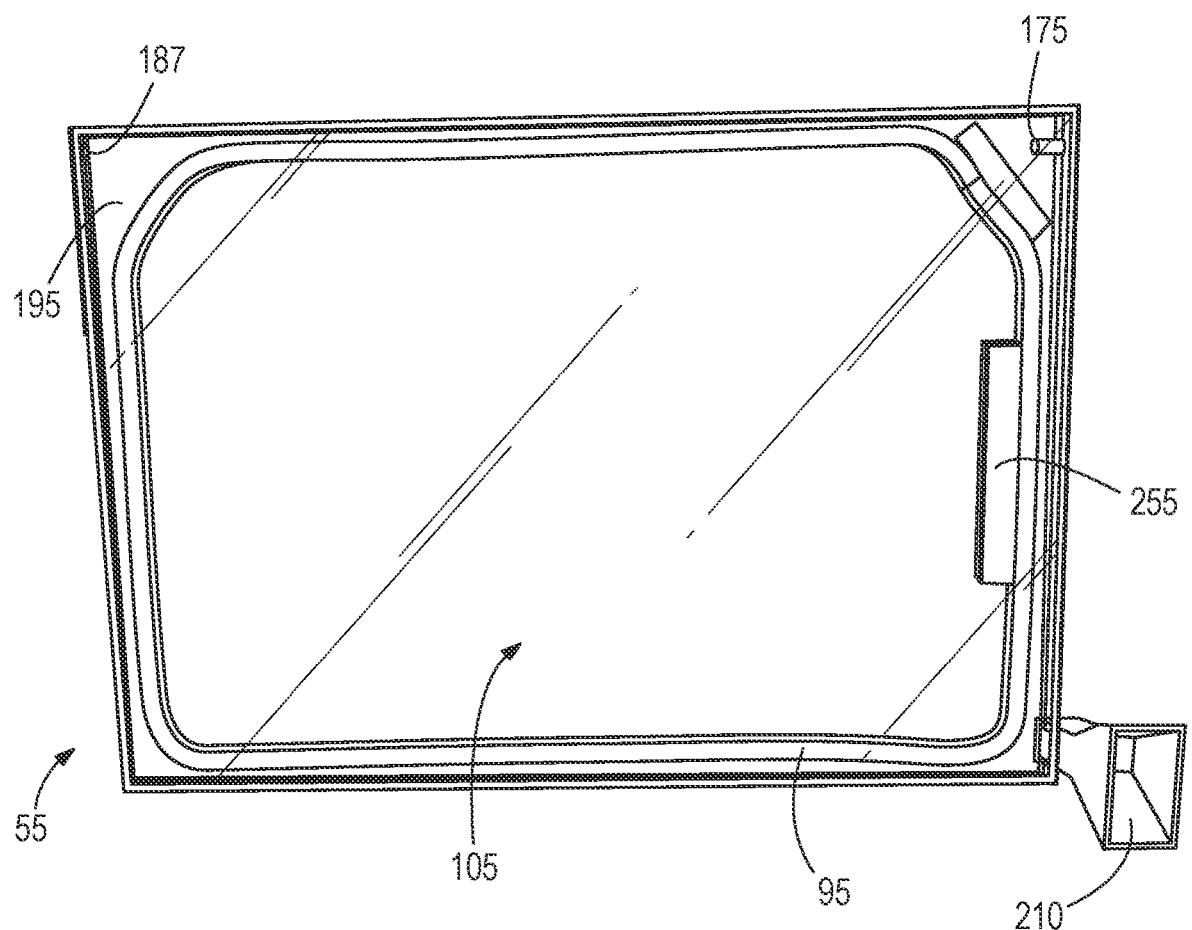
FIG. 21 is a perspective view of one door, illustrating a desiccant container positioned in the interior cavity of the door.

As best shown in FIGS. 3, 8, and 21, each door 55 includes a first glass pane 90, a second glass pane 92, a spacer 95, and an edge seal 100. The first and second glass panes 90, 92 are generally parallel to each other and are separated by the spacer 95. The edge seal 100 is coupled to the first glass pane 90 and the second glass pane 92 and is positioned exterior of the spacer 95. It will be appreciated that the edge seal 100 can take different forms (e.g., a wiper gasket retainer). The first and second glass panes 90, 92 and the spacer 95 define an interior cavity 105 of the door 55 that can be filled with a gas (e.g., a noble gas such as argon, krypton, xenon, other gases, or a mixture of various gases). As explained in more detail below, the first and second glass panes 90, 92, the spacer 95, and the edge seal 100 cooperate to define a seal passage 110 that can be filled with a transparent material (i.e. other than air).

The spacer 95 is formed of a transparent material (as the end product) and defines a monolithic structure that extends between the first glass pane 90 and the second glass pane 92 to form a space between the first and second glass panes 90, 92. As best shown in FIGS. 3-6 and 21, the spacer 95 can be made from a clear or transparent polymer (e.g., polycarbonate, polyester, transparent PVC, polyurethane, etc.), or another clear or transparent material. The illustrated spacer 95 has legs or sidewalls 120 and a central portion 122 extending between the sidewalls 120, and may be "U" or "C"-shaped in cross-section. In some constructions, the spacer 95 may have other shapes in cross-section (e.g., "D"-shaped, "O"-shaped, etc.). In these constructions, the enclosed shape of the spacer may have one or more openings through which material can flow into the spacer 95, as described in detail below.

Figure 4:
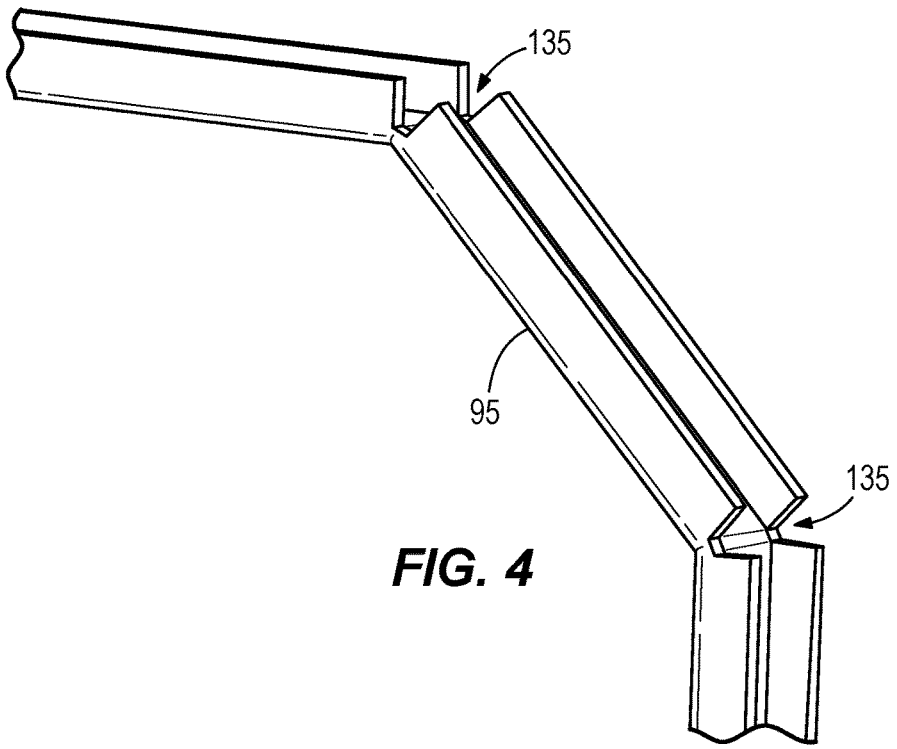
FIG. 4 is a perspective view of a portion of the spacer of FIG. 3.
Figure 5:
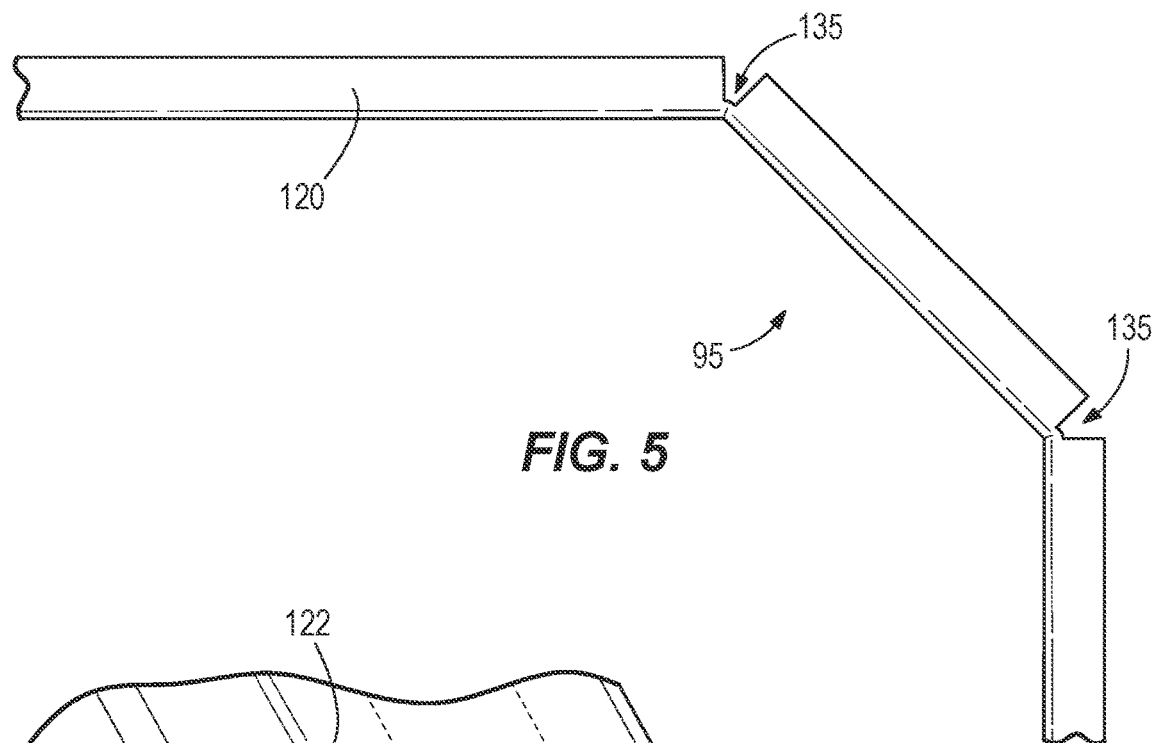
FIG. 5 is a side view of the portion of the spacer of FIG. 4.
Figure 6:
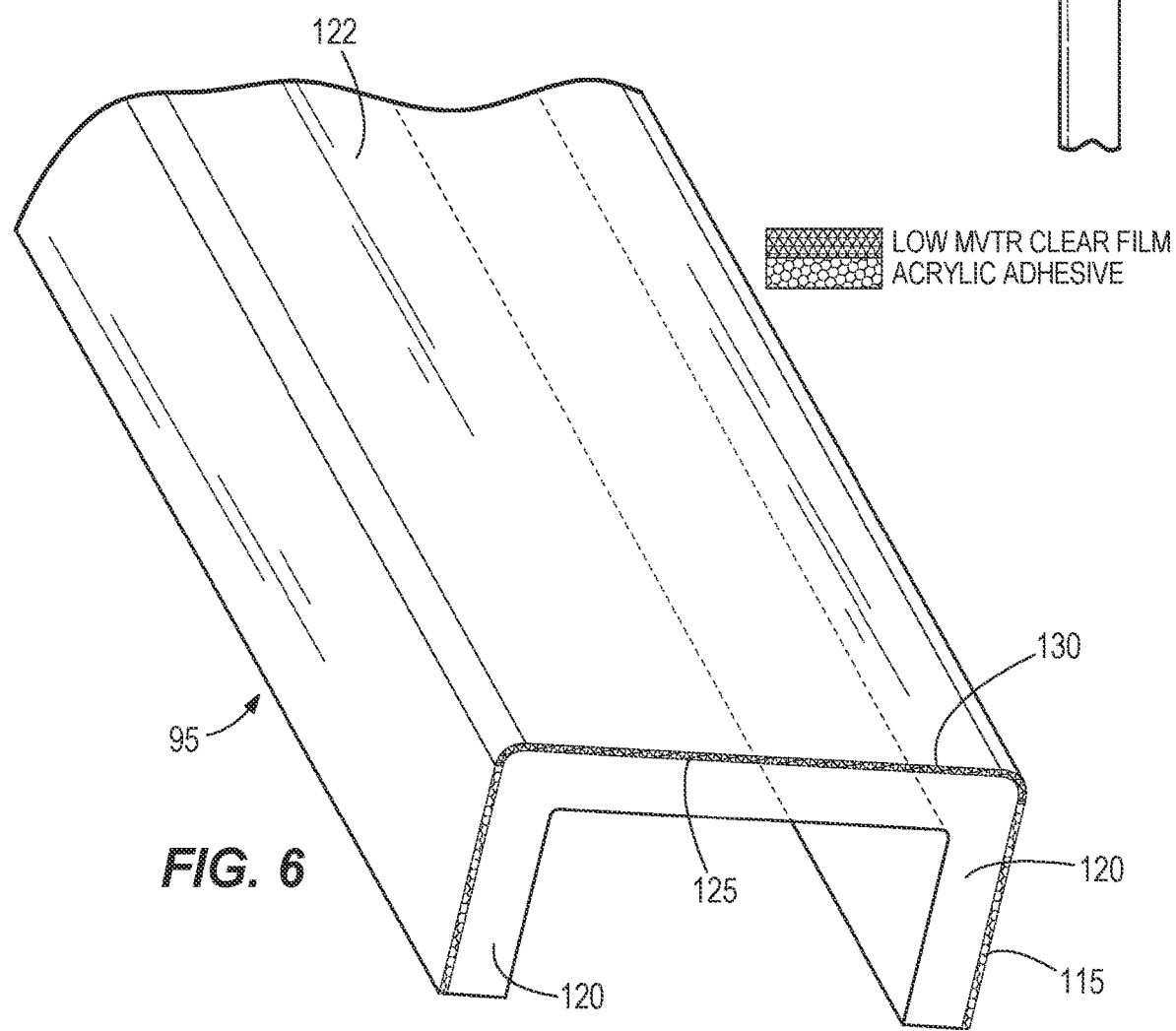
FIG. 6 is a perspective view of a portion of the spacer of FIG. 5 including a film and an adhesive.
Figure 10:
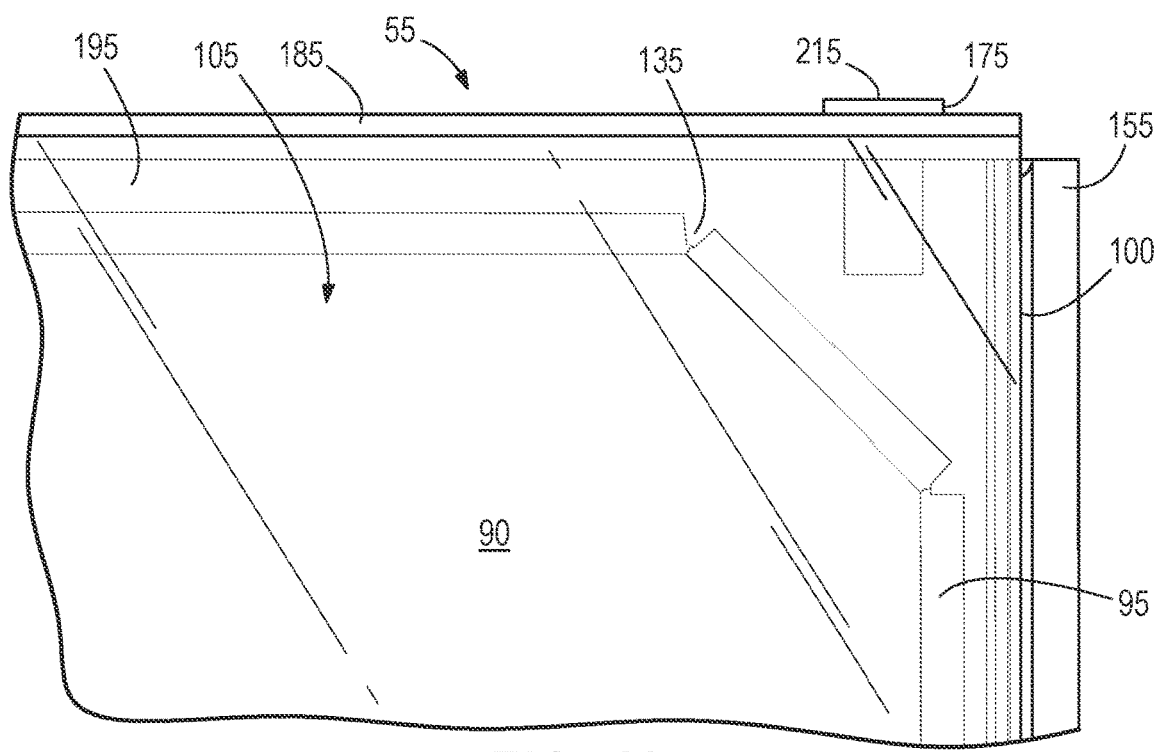
FIG. 10 is a side view of the door assembly of FIG. 9, illustrating the spacer, the wiper gasket, the hinge pivot bushing, and the hinge plate.
Figure 11:
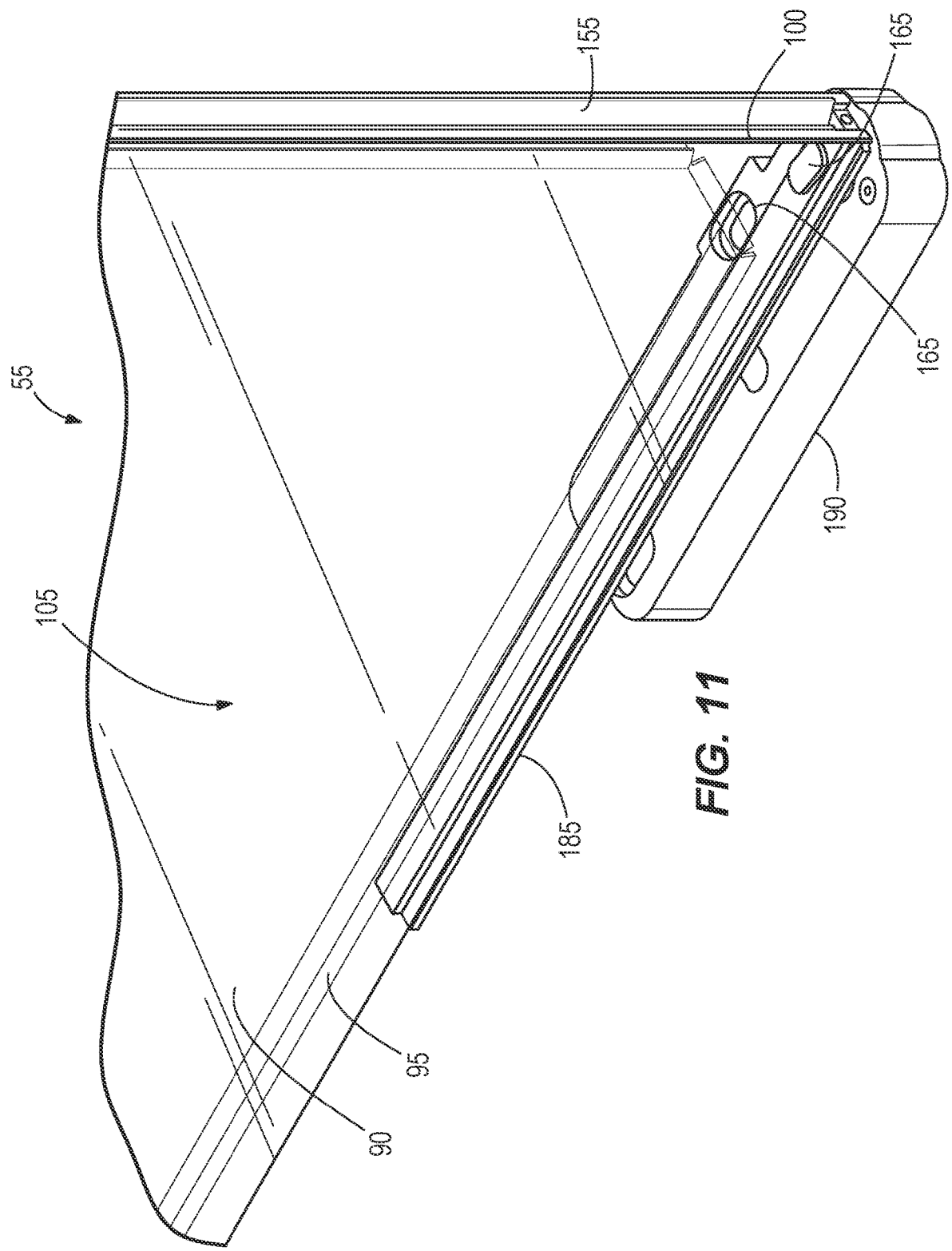
FIG. 11 is a perspective view of a lower portion of one door assembly, illustrating a hinge pin, a hinge pivot bushing, and a door close mechanism.
Figure 12:
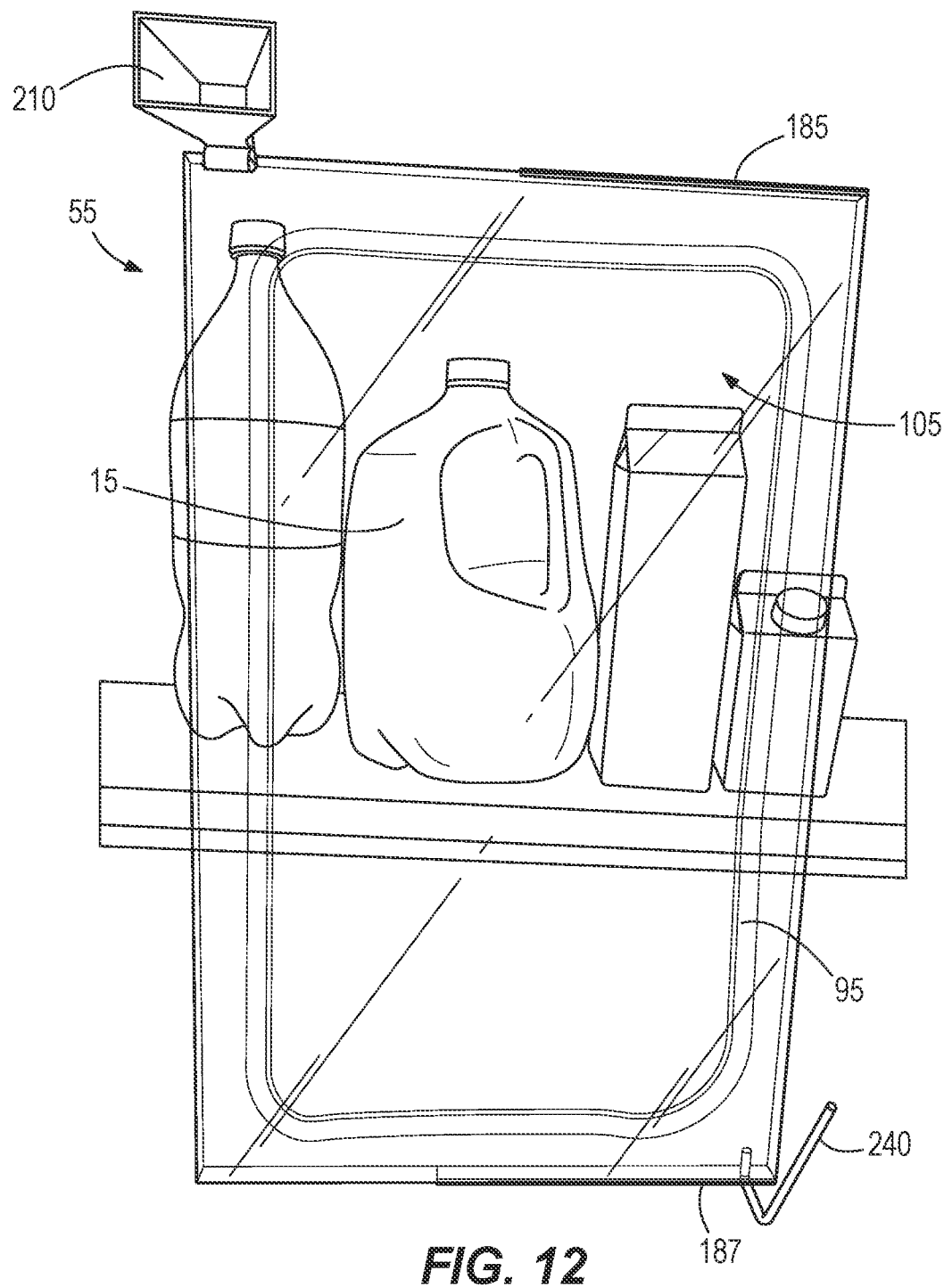
FIG. 12 is a perspective view of one door assembly, illustrating product 15 positioned behind and visible through the door.
Figure 15:
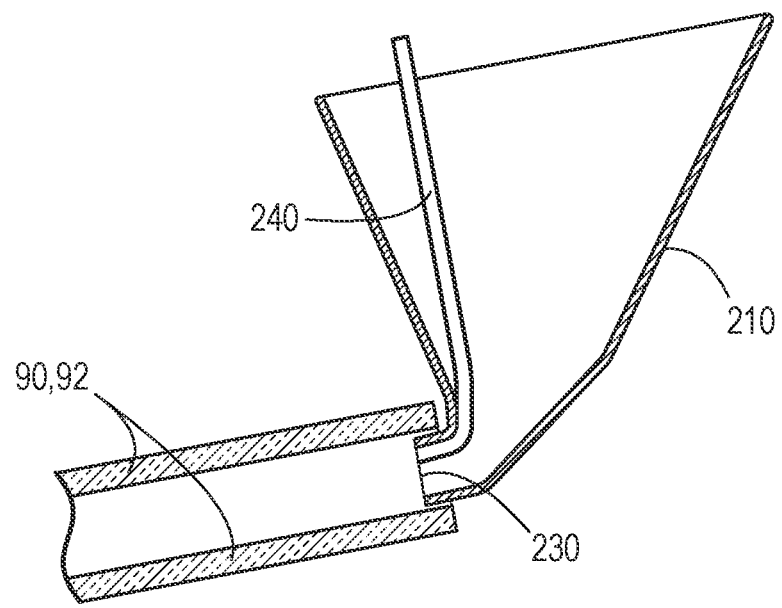
FIG. 15 is a cross-section view of the funnel of FIG. 14, illustrating a position of the funnel between the glass panes and a vent tube in the funnel.
Figure 16:
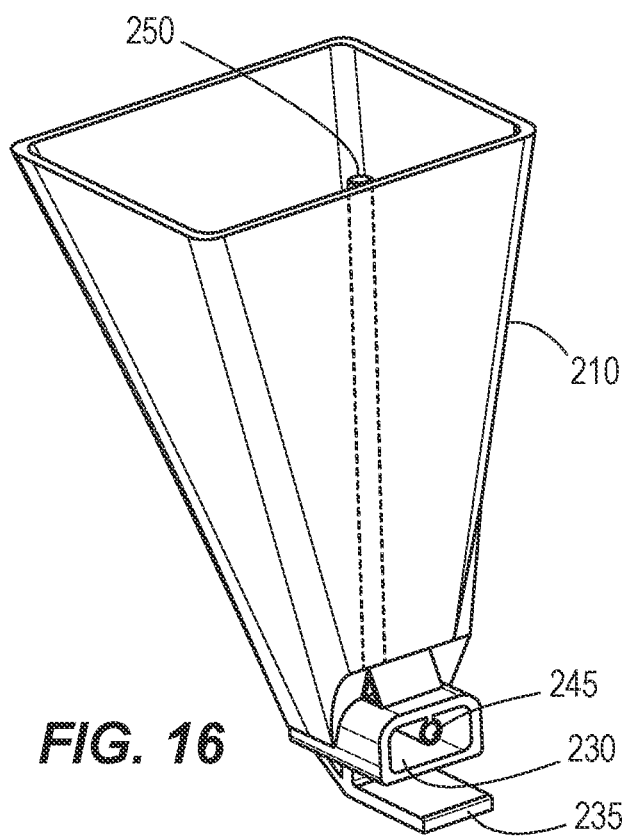
FIG. 16 is another perspective view of the funnel of FIG. 14 illustrating a vent tube inlet and a vent tube exhaust.
Figure 17:
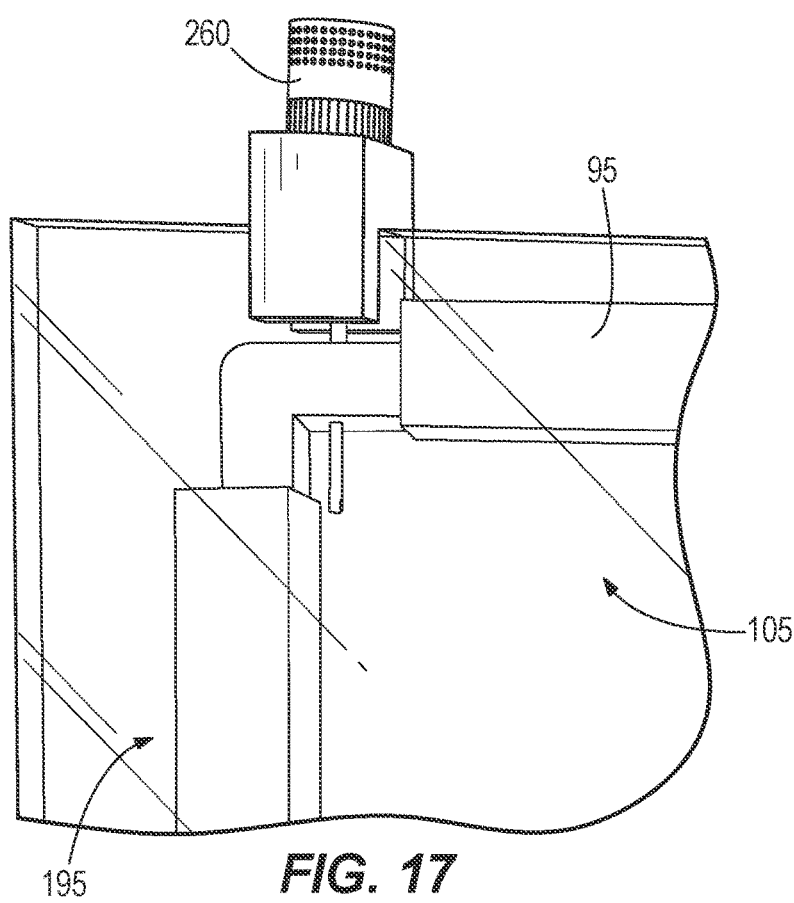
FIG. 17 illustrates a fill needle coupled to the door for filling an interior cavity of the door with a gas.
Figure 18:
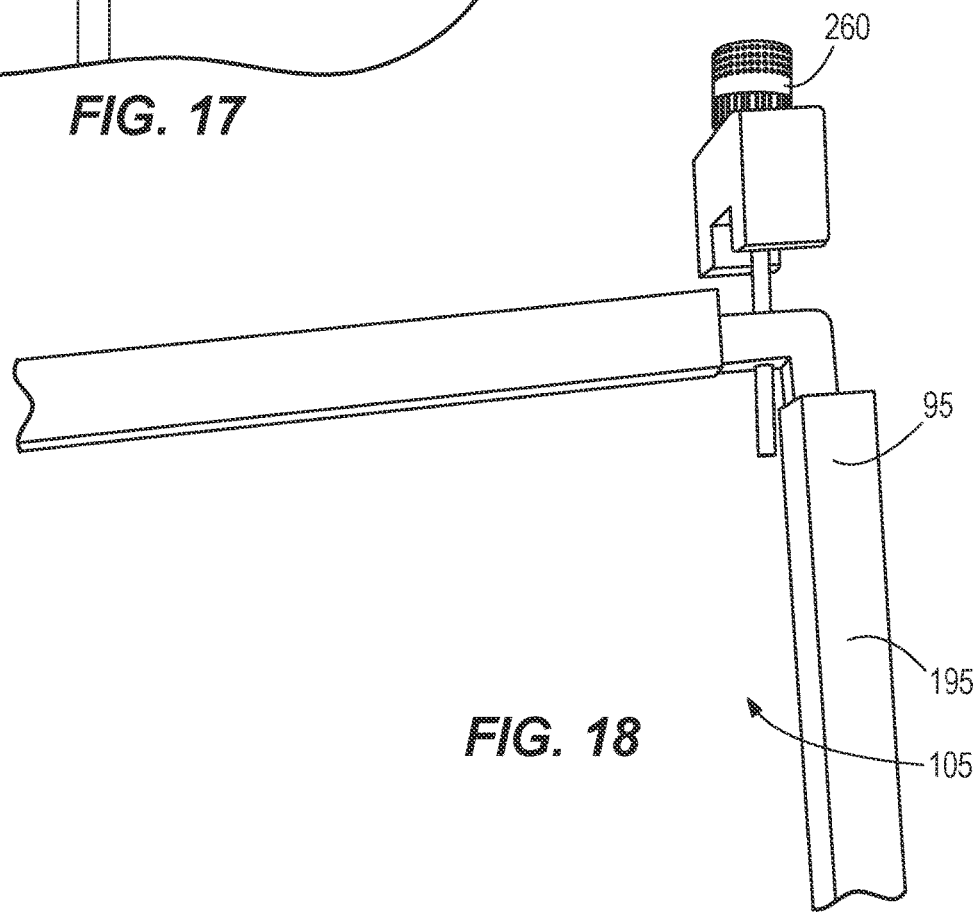
FIG. 18 is another view of the fill needle of FIG. 17.

As best shown in FIG. 3, the spacer 95 has an optically clear, acrylic pressure-sensitive adhesive tape 115 that is attached to the sidewalls 120 extending from a central portion 125 of the spacer 95. The sidewalls 120 serve to secure the spacer 95 to the first and second glass panes 90, 92. The adhesive tape 115 bonds to the glass surfaces and forms a temporary seal that bonds the first and second glass panes 90, 92 such that the panes 90, 92 are generally parallel in all six planes of the door 55. The spacer 95 has a very low moisture vapor transmission rate (MVTR) strip of film 130 bonded to the central portion of the spacer 95. The low MVTR film 130 is clear/transparent and serves to prevent moisture vapor and gases from penetrating the interior cavity 105 due to pressure differentials between the interior cavity 105 and the atmosphere. As shown in FIGS. 4, 5, and 10, the spacer 95 incudes notches 135 to allow the spacer 95 to generally follow the contour of the circumference of the first and second glass panes 90, 92.

Figure 7:
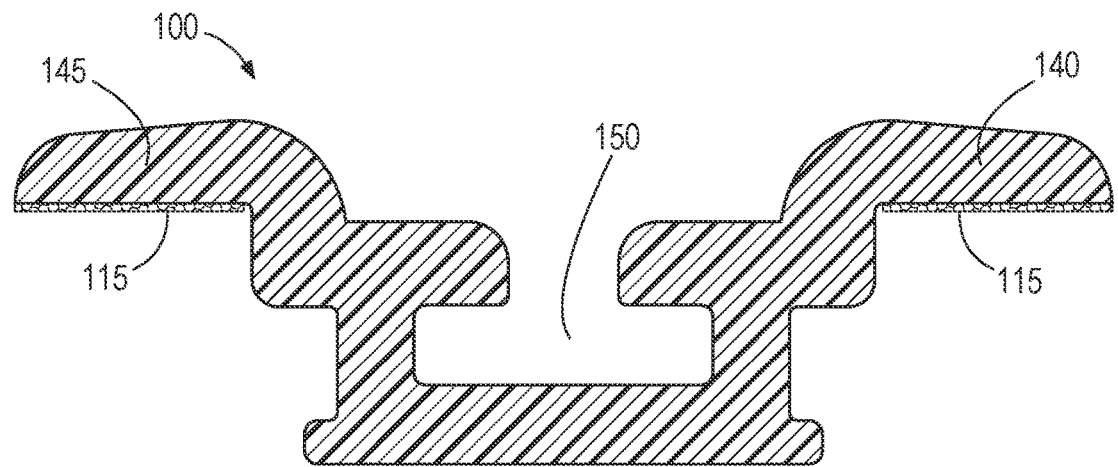
FIG. 7 is an end view of the edge seal of FIG. 4 in the form of a wiper gasket retainer of FIG. 3.

As shown in FIG. 3, the edge seal 100 is coupled to and extends between edges of the first and second glass panes 90, 92 to enclose the seal passage 110 adjacent the exterior of the door 55. As best shown in FIG. 7, the edge seal 100 includes a first end 140, a second end 145 opposite the first end 140, and a wiper gasket channel 150 that is defined between the first and second ends. While the edge seal 100 is symmetrical about a plane extending through the middle of the edge seal 100, the edge seal 100 need not be symmetrical. The first and second ends are attached to the first glass pane 90 and the second glass pane 92, respectively, via a strip of acrylic adhesive tape 115 or another attachment mechanism. The wiper gasket channel 150 is formed to retain the wiper gasket 155. The edge seal 100 can be formed by extrusion or molding of any suitable clear or transparent material. In some constructions, the edge seal 100 may be provided without the wiper gasket channel 150.

As shown in FIG. 3, a wiper gasket 155 is coupled to the hinge-side and the handle-side of the door 55, although the door 55 adjacent an end of the merchandiser 10 may only have the wiper gasket 155 on one side (e.g., the handle side). The wiper gasket 155 can eliminate the need for a mullion while still achieving a vapor seal between the ambient environment and the product 15 display area. The wiper gasket 155 also can improve merchandisability by eliminating view obstruction that can be caused by a mullion.

As best shown in FIGS. 8-11, the door 55 also includes a top hinge 160 and a bottom hinge 165. Each of the top and bottom hinges 160, 165 includes a hinge pin 170 that is attached to the case frame 60 and that is disposed in a hinge pivot bushing 175 positioned within a hinge pivot bushing cavity 180 in the door 55. The hinge pivot bushing cavity 180 is created by removing a portion of the cured urethane from the door 55. The door 55 also includes top and bottom hinge plates 185 (e.g., universal hinge plates) that facilitate relocation of mounting hardware for different configurations (e.g., left or right) of the door 55. The top and bottom hinge plates 185 extend along the top and bottom edges of the door 55 and provide extra strength and stability to the hinge attachment point. A door close mechanism 190 is attached to the door 55 to facilitate how the door 55 closes after being opened. The door close mechanism 190 is connected to the bottom hinge plate 185 as part of the bottom hinge 165.

Universal hardware is utilized to facilitate reversibility of the door 55. For example, the top hinge 160 and the bottom hinge 165 include the same or similar structure such that the door 55 can be removed and re-installed in a position rotated 180 degrees from the previously installed position. As a result, the door 55 can be installed to open toward the left or the right by flipping the locations of the top and bottom hinges 160, 165 relative to the refrigerated merchandiser 10.

The seal passage 110 is filled with liquid urethane that cures into a clear solid (i.e. cast urethane 195). It will be appreciated that other materials may be used to fill the seal passage 110, with the material being clear or transparent as an end product within the seal passage 110. The clear material disposed in the seal passage 110 will be referred to as "liquid urethane" or "aliphatic urethane" for purposes of description and as nonlimiting examples only, and it will be appreciated that other clear material can be used and is considered herein. Acrylic adhesive tape 115 attaches the wiper retainer 100 to the first and second glass panes 90, 92. The liquid urethane, which may be an aliphatic urethane, advantageously serves at least two critical functions when cast. First, the bond between the cast urethane 195 and the glass panes 90, 92 creates the primary seal of the door 55. Second, the bond of the cast urethane 195 to the first and second glass panes 90, 92 provides the primary structural integrity of the door 55 and enables the door 55 to support load and resist flexing while maintaining a hermetic seal of the interior cavity 105. The urethane chemicals and all other materials used are UV stable and resist yellowing over time. The polymer chemicals and components used in the embodiments of the door 55 described herein have a lower thermal conductivity than materials typically used around the perimeter of a merchandiser door 55, which improves the thermal performance of the door 55 relative to existing doors that have metallic spacers or metallic door rails around the perimeter of these doors.

The door 55 can be manufactured by mixing and metering the urethane using low pressure equipment (e.g., a vacuum-fill), or a high pressure clean, dry air to degas the materials before dispensing the urethane into the seal passage 110. In some constructions, the door 55 can be made using both processes. The degassing process contributes to the quality of the clarity of the cast urethane 195 and removes gaseous bubbles within the liquid urethane materials. The liquid urethane may also be heated to speed up the cure time for the urethane.

To assemble the door 55, the acrylic adhesive tape 115 is positioned on the contact surfaces of the spacer 95 to secure the spacer to the first and second glass panes 90, 92, and to the edge seal 100 (or to the corresponding edge surfaces on the glass panes 90, 92) to secure the edge seal 100 to the glass panes 90, 92. The spacer 95 and the edge seal 100 are then positioned between and relative to the first and second glass panes 90, 92 to form the interior cavity 105 and the seal passage 110. The interior cavity 105 is filled with a gas (e.g., Argon) via the fill needle 260 or another gas filling device that may be used. Thereafter, and with reference to FIG. 13, the door 55 is placed in a skewed orientation or angle that has first slope angle 215 relative to an x-axis in a horizontal plane 225, and a second slope angle 220 relative to a y-axis in the horizontal plane 225 to facilitate filling the seal passage 110. That is, the skewed orientation positions the door 55 such that none of the corners are in the same horizontal plane, and instead orients the door 55 so that a first corner of the door 55 is in or adjacent the horizontal plane 225, a second corner diagonally opposite the first corner is higher than the first corner and the remaining corners (referred to as a third corner and a fourth corner) that are closest to the first corner. In this orientation the liquid urethane flows from the second corner toward the third and fourth corners toward the first or lowest corner. The fill needle 260 can be removed and sealed by the monolithic urethane pour or remain in place and sealed by a polyisobutylene (PIB), which can be further sealed by a threaded plug to secure and compress the PIB sealant As the urethane cures, the urethane bonds to the glass panes 90, 92, the spacer 95, and the edge seal 100 along urethane bond surfaces 270 (FIG. 3). The use of a monolithic, continuous pour of urethane to cast the entire perimeter structure and to seal the interior cavity 105 is advantageous because there are no joints formed in the cast urethane 195 that could be structurally and/or hermetically deficient, and that may eventually become the source of a leak that compromises the seal integrity of the door 55. The monolithic pour also facilitates a reliable seal for the door 55 when the interior cavity 105 is filled with an inert gas, which provides superior reliability relative to existing doors due to the often-problematic issue of leakage or failure in conventional merchandiser doors.

As best shown in FIGS. 13-16, a funnel 210 is used to fill the seal passage 110 with urethane. The funnel 210 includes a tapered body, a nozzle 230 that is positioned adjacent an end of the tapered body, and a clip 235 that cooperates with the nozzle 230 to secure or hold the funnel 210 relative to the door assembly. The funnel 210 facilitates flow of the liquid urethane into the seal passage 110. The illustrated funnel 210 also includes a vent tube 240 that has a vent tube inlet 245 adjacent an end of the funnel 210 that is coupled to the door assembly, and a vent tube exhaust 250 adjacent an inlet to the funnel 210 to vent air from the seal passage 110 while the seal passage 110 is filled with the urethane. That is, the funnel 210 functions to pass liquid urethane into the seal passage 110 (via the force of gravity) while providing a vent for air that is displaced by the liquid urethane to exit the seal passage 110. This results in the reduction of air bubbles in the cast (cured) urethane 195. With reference to FIG. 19, vent material 265 (e.g., reticulated foam) can be used with the funnel 210, or elsewhere, to facilitate venting the seal passage 110 while the seal passage 110 is filled with urethane. The proper density of the vent material 265 is that which allows air to escape, but also traps the liquid urethane and prevents liquid leakage through the vent. For example, venting the passage 110 can be done via one or more of a) through the top hinge pin bushing 175, b) through the bottom hinge shaft hole, c) through the joints of the hinge plate 185, 187 and wiper retainers 100, and/or d) along the length of the wiper retainer 115.

As shown in FIGS. 20A-20C, a vent tube 240 may also be provided in another corner of the door 55 (e.g., the low corner of the door 55, during filling of the seal passage 110 with the liquid urethane) in addition to the funnel 210 and the vent in the funnel 210. This additional or separate vent tube 240 is advantageously inserted into the location that will become the hinge pivot bushing cavity 180, and allows air displaced by the liquid urethane flowing into the seal passage 110 to exit to the surrounding environment. This further facilitates the reduction of air bubbles 200 that would otherwise form in the cast (cured) urethane 195. In some embodiments, the venting may occur in a location other than the hinge pivot bushing cavity 180, which can be filled with urethane in a second step after the initial urethane pour through the funnel 210 is complete.

With reference to FIG. 21, the transparent door 55 can include a desiccant container 255 that is positioned between the first and second glass panes 90, 92 in the interior cavity 105 and that includes a desiccant to inhibit formation of moisture or condensation within the interior cavity 105. The desiccant material removes and/or adsorbs moisture and hydrocarbons that may be present inside the sealed cavity due to off-gassing of polymer materials used in the construction of the door 55. In an exemplary embodiment, the desiccant can be a mix of three angstrom molecular sieve desiccant (to adsorb the water vapor moisture) and silica gel desiccant and/or molecular sieve ten angstrom desiccant (to adsorb the hydrocarbons and prevent fogging due to off gassing of polymeric materials). The desiccant container illustrated in FIG. 21 is a plastic extrusion that is located adjacent the top of the door 55 to avoid the coldest region of the door 55. Silk screening on the first and/or second glass panes 90, 92 can be used to hide the desiccant container 255, or mirrored surface may be used in place of the silk screen.

After the urethane has dried, hinge pivot bushing cavities are formed (e.g., by drilling or another suitable process) in the cast urethane 195 to support the hinge pivot bushings 175. The hinge plate 185 and hinge pivot bushings 175 are installed on upper and lower edges of the door 55, which is then ready to be installed into the merchandiser 10 via the hinge pins 170 that are seated in the hinge pivot bushings 175. The door close mechanism 190, if equipped, is installed on the door 55 after placement of the lower hinge plate 185 on the door 55.

Various features and advantages of the invention are set forth in the following claims.

The invention claimed is:

1. An assembly comprising:
a first glass pane;
a second glass pane cooperating with the first glass pane to define a glass assembly;
a spacer positioned between the first glass pane and the second glass pane such that the first glass pane and the second glass pane are separated by a space, the spacer formed of a transparent material and extending between the first glass pane and the second glass pane to define at least one side of a cavity filled with a gas, the first glass pane, the second glass pane, and the spacer cooperatively defining a seal passage accessible adjacent to or at a perimeter of the glass assembly; and
a clear material disposed in and filling the seal passage at least partially within the spacer, the clear material bonded to the first glass pane, the second glass pane, and the spacer to provide primary structural integrity to the glass assembly.

2. The assembly of claim 1, further comprising an element coupled to the first glass pane and the second glass pane, wherein the element encloses the seal passage.

3. The assembly of claim 2, wherein the clear material includes liquid urethane that is curable into a clear solid configured to support a load of the assembly and to resist flexing while maintaining a seal of the cavity.

4. The glass assembly of claim 1, wherein the spacer has an opening facing the perimeter of the glass assembly, and wherein a portion of the clear material is directed into the opening.

5. The glass assembly of claim 4, wherein the spacer is U-shaped and includes sidewalls and a central portion extending between the sidewalls, and wherein the sidewalls define the opening and are attached to the first glass pane and the second glass pane, respectively.

6. The glass assembly of claim 5, wherein the spacer includes notches in the sidewalls adjacent corners of the first glass pane and the second glass pane such that the spacer follows a contour of the perimeter.

7. A door assembly comprising:
a first glass pane;
a second glass pane;
a spacer positioned between the first glass pane and the second glass pane such that the first glass pane and the second glass pane are separated by a space; and
an element coupled to the first glass pane and the second glass pane and positioned exterior of the spacer,
wherein the spacer and the element cooperate to at least partially define a seal passage,
wherein a clear material is disposed in the seal passage at least partially within the spacer and bonded to the first glass pane, the second glass pane, the spacer, and the element to seal the space, and
wherein the clear material is curable and is configured to provide primary structural integrity to the door assembly after the clear material has cured.

8. The door assembly of claim 7, wherein the spacer is located inward from an outer periphery of the first glass pane and the second glass pane.

9. The door assembly of claim 7, wherein the element includes a wiper retainer.

10. The door assembly of claim 7, wherein each of the first glass pane and the second glass pane have four sides, and wherein the spacer extends continuously around at least three of the four sides between the first glass pane and the second glass pane.

11. The door assembly of claim 10, wherein the spacer has sidewalls and a central portion extending between the sidewalls, and wherein the spacer includes notches in the sidewalls adjacent corners of the first glass pane and the second glass pane.

12. The door assembly of claim 7, further comprising a film bonded to the spacer on a face of the spacer facing the clear material, wherein the film has a low moisture vapor transmission rate.

13. The door assembly of claim 7, wherein the element is an edge seal that is coupled to and that extends between the first glass pane and the second glass pane to enclose the seal passage between an edge of the first glass pane and the second glass pane, wherein the spacer is formed of a transparent material and defines a monolithic structure extending continuously adjacent an outer perimeter of the first and second glass panes, wherein the first glass pane, the second glass pane, the spacer, and the edge seal cooperatively at least partially define the seal passage extending at least partially around the outer perimeter of the first glass pane and the second glass pane, and wherein the clear material is a polymer disposed in the seal passage and is bonded to the first glass pane, the second glass pane, the spacer, and the edge seal to provide structural integrity to the door assembly.

14. The door assembly of claim 13, wherein the edge seal has opposite ends and a wiper gasket channel between the opposite ends, and wherein the opposite ends are respectively adhered to the first glass panel and the second glass panel.

15. The door assembly of claim 7, further comprising a top hinge having a top hinge pivot bushing disposed in the clear material to rotatably support the top hinge, and a bottom hinge having a hinge pivot bushing disposed in the clear material to rotatably support the bottom hinge.

16. The door assembly of claim 7, wherein the clear material includes a solid material.

17. The glass assembly of claim 7, wherein the spacer has an opening facing the perimeter of the glass assembly, and wherein a portion of the clear material is directed into the opening.

18. A method of manufacturing a door or window, the method comprising:

positioning a spacer between a first glass pane and a second glass pane to separate the first glass pane from the second glass pane, the spacer formed of a transparent material, the spacer extending between the first glass pane and the second glass pane and cooperating with the first glass pane and the second glass pane to define at least one side of a cavity fillable with a gas, and the first glass pane, the second glass pane, and the spacer cooperatively defining a seal passage accessible adjacent to or at a perimeter of the first glass pane and the second glass pane; and filling the seal passage with a clear material, the clear material disposed at least partially within the spacer and bonded to the first glass pane, the second glass pane, and the spacer to provide primary structural integrity to the glass assembly while resisting flexing.

19. The method of claim 18, wherein the clear material includes urethane that is funneled into the seal passage via a funnel, and wherein air from within the seal passage is vented via a vent line in the funnel while the urethane is funneled into the seal passage.

20. The method of claim 19, wherein when the urethane is disposed in the seal passage, a vent line is positioned in a hinge pivot bushing location for mounting a hinge pivot bushing after filling of the seal passage with the urethane.

* * * * *